Dec. 20, 1960     M. A. HERMAN     2,964,850
UNIVERSAL STYLE GAGE

Filed Jan. 31, 1957     3 Sheets-Sheet 1

INVENTOR.
MARTIN ANDREW HERMAN
BY Oldham & Oldham
ATTYS.

Dec. 20, 1960  M. A. HERMAN  2,964,850
UNIVERSAL STYLE GAGE
Filed Jan. 31, 1957  3 Sheets-Sheet 2

INVENTOR.
MARTIN ANDREW HERMAN

BY Oldham & Oldham

ATTYS.

Dec. 20, 1960  M. A. HERMAN  2,964,850
UNIVERSAL STYLE GAGE
Filed Jan. 31, 1957  3 Sheets-Sheet 3

INVENTOR.
MARTIN ANDREW HERMAN
BY Oldham &
Oldham
ATTYS.

United States Patent Office 2,964,850
Patented Dec. 20, 1960

2,964,850

UNIVERSAL STYLE GAGE

Martin Andrew Herman, 7316 Dudley Ave.,
Cleveland 2, Ohio

Filed Jan. 31, 1957, Ser. No. 637,404

11 Claims. (Cl. 33—174)

This invention relates to gages, and especially to a gage that is readily adaptable to be changed for use in measuring or gaging a variety of different sizes of articles, such as jet turbine blades, or which can easily be adjusted for making different tests on a given article.

Heretofore, when gages have been desired for any particular article, usually a special gage has to be built for each article to be gaged or checked for manufacturing or production accuracy. As these gages must be made with extremely close tolerances in many instances for closely checking the sizes and shapes of manufactured articles, obviously the gages are costly to produce and the gages have to be carefully used. A further disadvantage in prior types of gages is that usually the gages have required an appreciable length of time for manufacture, as anywhere from two to six months might be required depending upon the work load and capacity of a particular gage maker. This delay is objectionable in many instances.

While one or more types of standard gages have been provided heretofore, none of them have been readily adjustable to a variety of sizes nor have they been easily adapted to test or measure any of a number of different articles, as desired. Such prior gages, insofar as I am aware, have required appreciable revision, readjustment, or reassembly of component parts thereof before the gage can be adapted over from testing one item over to checking or gaging a second item. Yet a further difficulty with previous types of gages is that after a gage has been rebuilt or reassembled to adapt it for checking a second article, it then is a costly, tedious operation equivalent to the initial conversion job on the gage in order to reconvert it over for use with the first test article for gaging purposes.

One patented gaging means allegedly adapted for adjustment so as to gage different items therein by resetting of the gage is shown in Patent No. 2,709,854. Such patent particularly relates to the positioning of so-called "guillotine" gage blades. However, the apparatus disclosed in such patent requires rearrangement of a number of gaging blocks by disassembly of a stack of the gaging and spacer blocks provided and reassembly thereof in order to convert the gage from use with one article over to use with another different article, similar to the first but of a different size. While such structure theoretically operates satisfactorily, it is a tedious, time consuming job to disassemble and reassemble this type of a gage means for use in gaging a second style or sized article. Also, the positioning of the gage blades is limited by the number and size of the spacer blocks provided. Hence, the practical adjustability of such gage is quite limited.

The general object of the present invention is to provide a new and improved type of a gage characterized by the ease and readiness of adjustability of the gage so that it can be converted from a gage for one item over into a gage for a second similar item.

Another object of the invention is to provide a gage which can position any number of a desired gaging means thereon for checking items such as elongate turbine blades and wherein different gage means can readily be engaged with the apparatus of the invention.

A further object of the invention is to provide a removable limited movement sub-base in a universal style gage wherein means on the sub-base can be used as a reference and where the sub-base can position any of a number of desired gage means thereon.

Another object of the invention is to provide a gaging means wherein a support turret can be moved along one axis of a gage base and can rotate along such axis of the base a desired arcuate amount in relation to templates or gages provided on vertically spaced support platforms in the gage means.

A further object of the invention is to position all gage means in a gage apparatus upon either a movable sub-base therein or upon adjustable support platforms so as to render the gages readily adaptable for use in checking different articles, as desired.

Another object of the invention is to provide a gage using a pair of vertically extending support columns, one at each end of the base member, and wherein these support columns carry vertically adjustable gage supporting cartridges or platforms therein and wherein the support columns can be engaged with any of a number of base members and extend in exactly perpendicular relationship therefrom.

Yet a further object of the invention is to provide a gage of the type described and wherein a pair of vertically extending support columns can be accurately engaged with a support base, be removed therefrom, but be re-engaged in exactly the same position as that previously provided between the parts of the gage.

Another object of the invention is to provide a gage using a plurality of support columns therein, wherein the columns are so positioned on one side of the gage as to provide ready accessibility to the gage means for inserting an article thereinto for gaging purposes and for ready adjustment and removal of the gage support platforms as required.

Still another object of the invention is to provide a gage comprising a base, a pair of vertically extending support columns extending from the base, and support platforms extending exactly prependicularly from the support columns and wherein such support platforms are exactly parallel with each other and the transverse axes of the platforms are parallel with a center line of the base.

Another object of the invention is to provide special complementary contours between a gage base and support columns secured thereto so as to align certain axes of such support columns parallel to an axis of the base and to have the support columns extend exactly perpendicularly from a reference surface on the gage base.

Still another object of the invention is to provide special non-circular contours between support columns and gage support platforms or cartridges, so that the support platforms can extend from the support column so that their axes are in exactly parallel relationship with each other and be exactly perpendicular to the longitudinal axis of the support columns.

Yet another object of the invention is to provide relatively costly gage means with special adjustability features whereas they are particularly suited for gaging a plurality of various parts with a minimum of adjustment thereof.

The foregoing and other objects and advantages of the invention will be made more apparent as the specification proceeds.

It should be realized in the apparatus of the invention, that any of a number of types of sub-bases can be removably secured to the gage base and with the surface of the base being a reference surface in the gage. Then any desired style of gaging means can be mounted upon such removable sub-base or on a rotary turret on the sub-base to be positioned accurately with relation to any base on which such means are positioned. The sub-base can have limited sliding movement along the center axis of the sub-base, but can be extremely accurately positioned thereon. Thus the other gage means provided likewise are accurately positioned with reference to the main base and to the center of the reference surface thereon even though carried by a movably positioned member in the gage assembly. A turret can be positioned on a sub-base that has limited movement along one axis of a gage base. Thus the turret can rotate at any desired center on such gage base axis.

This application is a continuation-in-part of my prior application Serial No. 573,245, now abandoned, filed March 22, 1956.

For a better understanding of the invention, attention is directed to the universal style gage illustrated in the drawings, and wherein.

Figure 8:
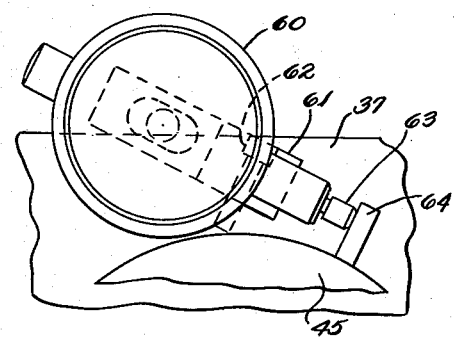
Figure 9:
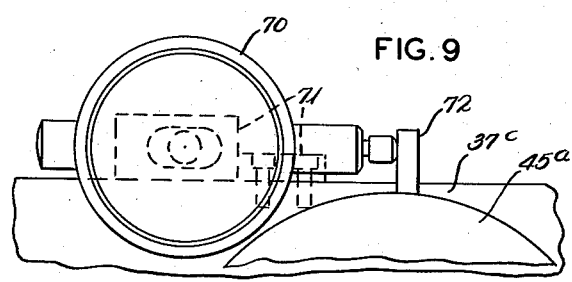

Fig. 8 is an enlarged fragmentary plan view of a portion of the gage means of the apparatus which portion is particularly adapted for accurately measuring arcuate movement of the turret on the sub-base of the gage; and Fig. 9 is a modified view of a further style of a gage means of the invention and particularly the portion thereof for indicating or measuring limited arcuate movement of the turret means of the gage.

When referring to corresponding parts shown in the drawings and referred to in the specification, corresponding numerals are used to facilitate comparison between such equivalent parts.

The present invention can be used for positioning so-called guillotine gage blades, but it also positions a plurality of other gage means thereon. Thus typical articles which may be gaged with the apparatus of the invention are the buckets, or jet blades of turbine engines. The gage can be adjusted from gaging one specific turbine blade over to use for gaging a different blade by changing the particular guillotine gage blades in the apparatus, and/or by rearranging the gage blade holding means vertically in the apparatus and by using similar or identical gage means on the gage blade holding means for gaging different sizes or shapes of turbine blades or other articles. Other sub-bases can be provided for a given gage base to change a gage over for use with a different article.

Generally speaking, the present invention relates to a gage comprising a base, a pair of support columns, one of which is adjacent each end of said base, means securing said support columns to said base near the corners thereof, said base being recessed or contoured complementary to portions of said support columns, a plurality of support platforms contoured to engage and extend from each pair of said support columns in exactly parallel relation, means securing said support platforms to said support columns to be vertically adjustable thereon, gage means carried by said support platforms to extend therefrom for gaging action, a sub-base removably carried by said base on the upper surface thereof and gage means carried by said sub-base for an article to be gaged.

Attention now is particularly directed to the details of the structure shown in the accompanying drawings, and the gage of the invention is indicated as a whole by the numeral 1. The gage 1 includes a base 2 which has a plurality of exactly parallel support columns 3 secured thereto and extending upwardly therefrom perpendicularly to a flat top surface 2a of the base. Preferably the gage base 2 is recessed or contoured near the corners of one side thereof as indicated at 4 to engage with and be shaped complementary to a pair of edges or flats 3a and 3b that form one of the symmetrical corners provided on the support columns 3. Thus the support columns 3 are formed to some non-cylindrical shape, and preferably one having a plurality of flat sides or edges thereon, such as being square or pentagonal, or of polygonal shape, as desired. In all events, these recesses 4 are shaped complementary to the edges 3a and 3b of the support columns 3 so that an accurate or exact positioning of the support columns 3 on the base 2 is provided. Thus the diagonal axes of the support columns extending towards the base are positioned exactly parallel with each other and with the transverse axis of the base 2. The support columns preferably are secured to the base 2 as by the use of a plurality of vertically spaced cap or socket screws 5, or the like. The position of the support columns is further fixed with relation to the base 2 by providing keys 6 (Figs. 1 and 3) that extend into slots provided in edge portions of the support columns 3 normal to the longitudinal axis thereof. The keys 6 are suitably secured to the base 2, as by cap screws 7 or the like and prevent any vertical movement of the support columns.

The drawings clearly show that one support column 3 is provided near each end of the base 2. In some instances, it may be desirable to use pairs of such support columns at each end, or side of the base 2, or it may even be desired to use only one support column at opposed ends of the base 2 for supporting gage means in an adjustable manner in the gage 1 of the invention.

A plurality of support platforms, or cartridges 8 are adjustably carried by and positioned by each of the support columns provided in the gage 1. These support platforms 8 are recessed as at 9 at one end thereof, which recesses 9 are likewise shaped angularly complementary to the edge contour of the support columns 3 so that the support platforms will smoothly and tightly engage therewith and can be accurately positioned by the support columns exactly parallel with each other and the transverse axis of the base 2. The recessed walls 9 of the support platforms 8 are normal to each other, to the flat top surface 2a of the base 2, and to flat top surfaces of the support platforms. These support platforms are secured to the support columns 3 by end plates or end caps 10 that are removably secured to the support platforms 8 as by cap or socket screws 11. It will be noted that the end caps 10 are recessed at 12 complementary to edge portions of the support columns 3 so that such end caps will smoothly and accurately engage therewith.

Figure 1:
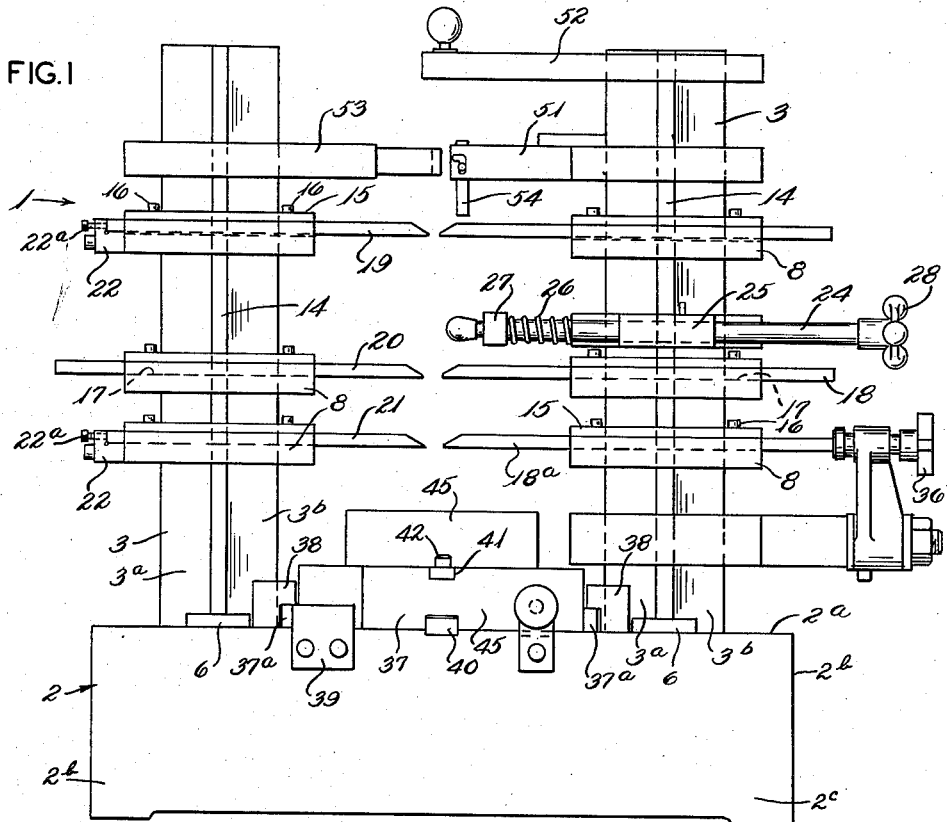
Fig. 1 is a front elevation of the universal gage embodying the principles of the invention.
Figure 3:
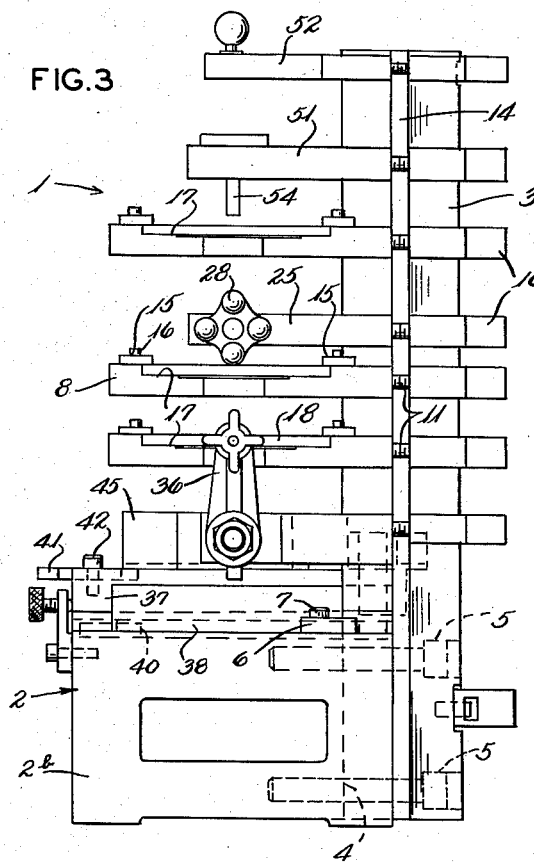
Fig. 3 is a right side view of the gage of Fig. 1.

Figs. 1 and 3 of the drawings best show that the corners of the support columns 3 are flattened, as indicated at 14. The recesses 12 in the end caps have base portions 12a therein so that the recesses 12 will smoothly and snugly engage with adjacent edges of the support columns 3 and one of the corners provided thereon. Similar recesses 9a are provided on the support platforms.

It will be realized that any desired number of the support platforms or cartridges 8 can be provided and be positioned in any desired adjustable vertical positions on the support columns 3. These support platforms 8 are adapted to carry any desired type of gage means thereon, but the invention provides apparatus especially useful with so-called guillotine style gage blades. In order to position this style of gage blades on the gage 1, a plurality of guide bars 15 are provided and pairs of these guide bars 15 are secured in spaced parallel relation to some of the support platforms 8, usually by removable means, such as cap or socket screws 16. The support platforms 8 are recessed at the center portions thereof at 17 to aid in receiving the guillotine gage blades 18 slidably therein. Thus usually the guides 15 extend over the recesses 17 provided in the support platforms and thereby slidably retain the gage blades 18 in the gage seats provided therefore. The numeral 20 also indicates a movable gage blade. The drawings show that the gage blades 18 move parallel to the longitudinal axis of the support platforms 8 and normal to the transverse axis of the support platform on which any one gage blade is positioned.

Gaging action in the gage means provided is facilitated by providing a plurality of stationary type gage blades indicated at 19 and 21 at one side of the gage 1 and clamp locks 22 may be secured to the edge portions of the support platforms 8 to secure certain of the blades, such as blades 19 and 21, fixedly to their carrier support platforms. The clamp lock 22 is secured to the axially outer end of the support platform and contacts the gage blade to limit or prevent movement thereof. A set screw 22a is carried by each clamp lock 22 and can be moved to engage the outer ends of the gage blade positioned thereby to move such blade inwardly of the gage. Such resetting of a blade would be made when its inner end or edge is reworked or otherwise changed.

As previously indicated, the gage 1 of the invention is particularly adapted for use in gaging turbine buckets or blades or similar elongate articles. Such article can be initially engaged with the apparatus of the invention by positioning one edge portion thereof in engagement with the stationary gage blades 19 and 21 and then releasably clamping the article in position by use of a spring pressed clamp rod 24 extending from an opposite end of the gage 1. This clamp rod or bar 24 is slidably positioned in a carrier block 25 removably secured to and extends from an inner portion of one of the support columns 3 like the support platforms 9. A spring 26 extends between such bracket 25 and a collar 27 on the clamp rod 24 to urge the bar 24 inwardly at all times. A handle 28 is carried by the outer end of the clamp rod 24 to facilitate moving such clamp rod from engagement with the turbine blade 23 when desired.

In this embodiment of the invention, a clamp 36 is provided and is carried by the lower-most support platform 8 on one side of the gage 1. Such clamp 36 can be used for retaining a lower gage blade 18a in a fixed position in the gage, if desired.

As another important feature of the gage 1, a removable sub-base 37 is provided therein. This sub-base 37 is slidably and removably secured to an upper portion of the base 2 as by use of a plurality of gibs 38, Fig. 1. These gibs slidably engage flanges 37a extending from opposite sides of the sub-base. A stop plate 39 is shown secured to the base 2 at opposite edges thereof to extend upwardly therefrom for limiting the position of the sub-base 37 and aiding in accurately aligning it with the edge of the base 2, if desired. A pair of keys 40 extend into opposed slots provided in the associated surface portions of the sub-base 37 and base 2 to insure accurate positioning of the sub-base 37 on the base 2.

Figure 4:
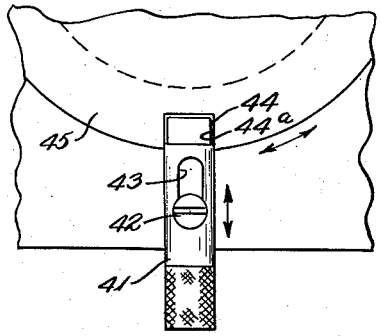
Fig. 4 is a fragmentary plan view indicating the action of one of the lock keys associated with the rotatable turret on the sub-base of the gage of the invention.

Another important feature of the gage 1 is that a turret 45 is rotatably positioned on the sub-base 37. Fig. 4 best shows the action of a special type of a lock key provided for controlling the amount of arcuate movement permitted by the turret 45 in this particular embodiment of the invention. In this instance, a key 41 is secured to the sub-base 37 by means of a headed screw 42 that extends through a slot 43 provided in the key 41. The key 41 has a reduced width end section 44 that is continually received within a slot 44a provided in the turret 45. This key 41 also is positioned by being received in a complementary shaped slot (not shown) in the upper surface of the sub-base 37. The key 41, when moved to its extended or radially outer position, is adapted to permit the turret 45 to have limited arcuate movement on the sub-base within the normal limits of rotation to measure the twist in a turbine blade being gaged by the apparatus of the invention. When the key 41 is in its radially innermost position, the wider portion or body of the key 41 is snugly received in the slot 44a so that no arcuate movement of the turret is provided and the turret is accurately indexed in the apparatus so that effective gaging action can be provided thereby, and a zero setting for the indicator can be established.

Figure 5:
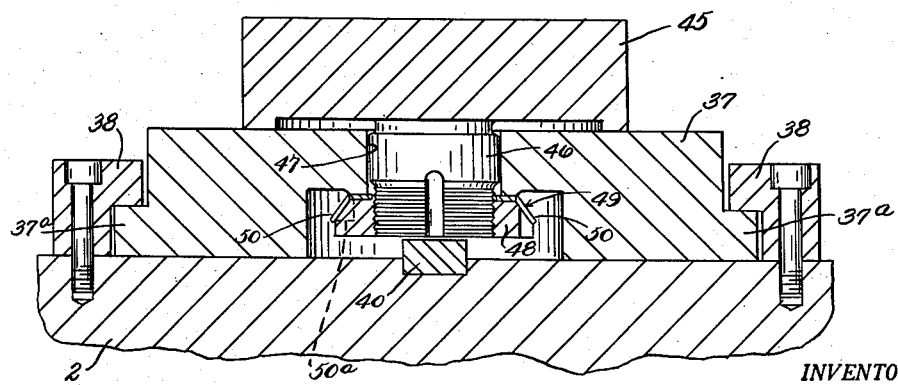
Fig. 5 is an enlarged fragmentary vertical section through the sub-base and rotary turret supported thereon.

The turret 45 has an integral boss 46, Fig. 5, extending downwardly therefrom and which accurately registers with an aperture 47 provided in the sub-base 37 usually at the exact center thereof. Preferably the lower, or inner, end of the boss 46 is threaded and a lock nut 48 engages therewith to hold the turret 45 snugly on the sub-base 37. A suitable washer, or bearing 49 is positioned between the adjacent surfaces of the lock nut 48 and the adjacent surfaces of the sub-base 37 to provide a rotary connection therebetween. This bearing 49 has a series of circumferentially spaced, downwardly extending flanges or lugs 50 provided on the periphery thereof and the nut 48 is provided with several peripheral recesses 50a for engaging any desired lug 50 for locking the nut in position to secure smooth arcuate action for the turret. Any lug 50 can be bent down into a recess 50a when aligned therewith.

Figure 2:
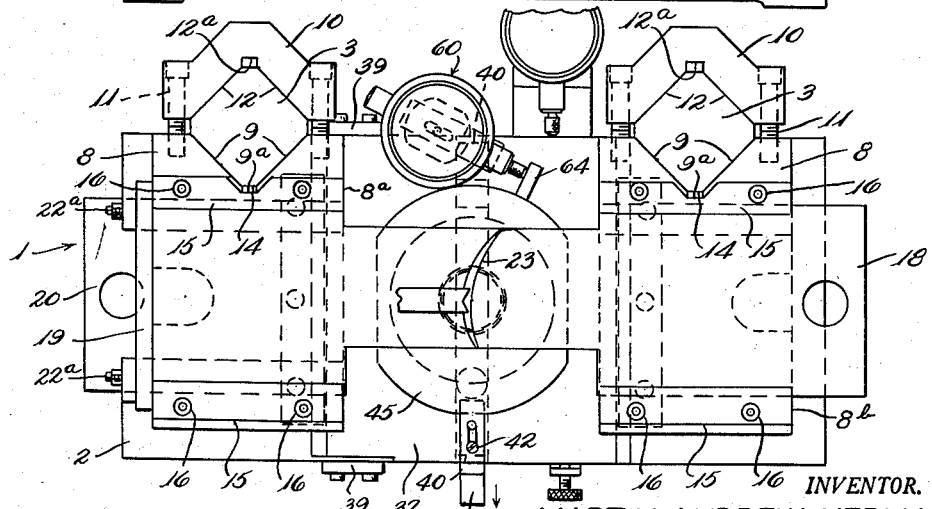
Fig. 2 is a plan of the gage of Fig. 1.

Figs. 1 through 3 of the drawings best show that a special type of gage means may be provided by the uppermost gage support platforms or equivalent members that are positioned by the support columns 4 of the invention. Or, a plurality of such special gage support means may be provided at the upper ends of the support columns 3. In all events, the support platforms carried by the support columns 3 would be provided with complementary surfaces or recesses adapted to engage with the support columns at edges or corner areas thereof so as to extend normally therefrom and with the axes of the gage support platforms being exactly parallel with the other gage support platforms of the apparatus. Hence, a plurality of special support platforms indicated at 51, 52 and 53 are shown in Fig. 1 of the drawings, and with a special vertically downwardly extending flush pin gage 54, or the equivalent being carried by the support platform 51. Such a gage is particularly adapted for measuring the length of a turbine blade or equivalent article positioned in the gage 1 for test purposes.

Figure 6:
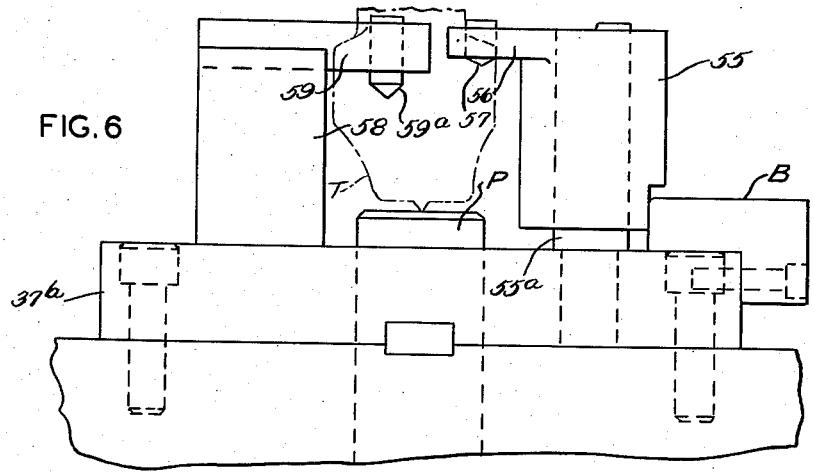
Fig. 6 is a fragmentary elevation of a modified type of a sub-base and gage assembly as can be provided by the invention.

In the modification of the invention shown in Fig. 6, a sub-base 37b is provided with means, such as a flush pin gage block 55 that is slidably mounted on a pin 55a carried on the sub-base 37. Such gage block 55 has an arm 56 extending therefrom and a fixed pin 57 of any desired form extends from this bracket arm 56, usually for engaging a suitable shoulder or shelf on the turbine blade T. The support platform 53 may engage a lug (not shown) provided on the turbine blade T for manufacturing purposes only and removed after the article has been gaged and found to be of satisfactory size and shape. A thrust pin P is provided in Fig. 6 for forcing the turbine blade T up against the fixed locator 59. A special guide block B is illustrated in Fig. 6 to permit accurate arcuate location of flush pin gage block 55, as such flush pin gage block is rotatably carried by the pin 55a.

This sub-base 37b also has a fixed locator gage or block 58 secured thereto and it has a bracket arm 59 extending therefrom to position a fixed locator pin, or the like 59a. Such fixed locator pin 59a is suitably positioned in the gage so as to measure the desired distance from the reference surface i.e. the top surface of the base 2 provided in the gage. The fixed locator pin 59a normally is so positioned that it engages a particular section of the turbine blade T for gaging or measuring action thereon. Obviously, other styles of fixedly positioned or movable gage means can be secured to this sub-base 37 and adapt the gage for testing a particular item. When it is desired to test other items, the operator need only slide the sub-base 37b from engagement with the gage base and position a new sub-base in association therewith. The gage means carried by the sub-bases are, in all instances, accurately positioned with relation to the reference surface of the gage base 2 and hence are immediately set up for gaging action as soon as the sub-base is operatively positioned on a gage base, inasmuch as the distance between such gage means on the sub-base and the reference surface on the gage base can be the same in all gages made in accordance with the principles of the invention.

Figure 7:
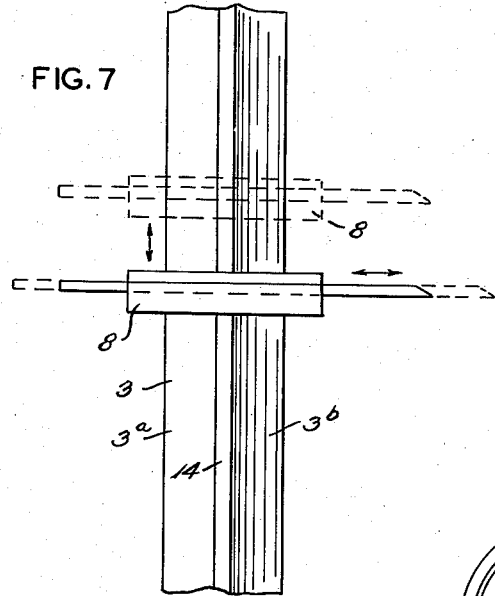
Fig. 7 is a semi-diagrammatic fragmentary elevation of one support column of the invention indicating how the gage support platform and gage means thereon can be adjustably positioned in accordance with the teachings of the invention.

Fig. 7 of the drawings best indicates how the gage support platforms 8 of the invention can be readily moved vertically on the support posts or columns 3 of the gage and can be resecured in position thereon. All of such positions are controlled so that the support platforms on one support column are all parallel to each other and with the transverse and longitudinal center lines thereof exactly aligned with each other and superimposed with relation to at least one corresponding axis on the sub-base of the gage means of the invention. Such transverse and longitudinal center lines of the different support platforms 53 secured to any one support column 3 are vertically aligned and with such center lines thus defining planes parallel to the longitudinal axis of the support column with which they are associated. For square support columns, the transverse axis of a support platform must be on an extension of the diagonal of the support column to obtain the desired vertical alignment of the axes of the support platforms 53.

Fig. 8 of the drawings shows that a suitable gage 60 can be secured to one edge portion of the sub-base 37 as by means of a positioning bracket 61, which is suitably secured to the sub-base 37 by cap screws 62. The support block 61 preferably extends into a specially contoured recess provided in the sub-base so that the operative pin or indicator point 63 of the gage 60 extends therefrom and is adapted to engage a pin 64 suitably carried by and extending from the turret 45.

The invention also contemplates that a larger turret 45a than the one shown in Figs. 1 through 8 may be provided on the gage means of the invention and thus Fig. 9 illustrates how a gage 70 would be secured to a sub-base 37c to extend along one edge surface thereof. A special support block or bracket 71 is used for positioning this gage 70 on the gage of the invention so that the operative arm of the gage 70, in this instance, will extend directly along and parallel to the edge surface of the sub-base 37c and will contact a suitable stop, or control pin 72 secured to and carried by the turret member 45a of the invention.

In some instances, it may be desirable that the support posts or columns of the gage of the invention have a special contour on only one side or edge thereof, whereas the remainder of the support column need not have any special contour. Thus, only the engaging faces between the support column and the gage support platforms need be contoured complementary to each other, and be of non-cylindrical shape in order to fixedly locate the axes of the support platforms with relation to each other and with relation to the support column and other means positioned thereby. Hence, the end caps 10, or other securing means engaging with opposite faces of the support columns, need not have any inter-engaging, complementary contours except for insurance purposes. The accurate poistioning of the support platforms is definitely fixed by the edge portions of the support column 3 and the support platform 8 which meet to position the support platform. If extra precautions are desired in order to position the support platforms accurately, then the end caps and opposite faces of the support columns may have complementary contours as shown in the drawings, but with such additional inter-engaging means being an additional feature, not required in practice of the invention in all instances.

It should be observed that the gage 1 of the invention can be used when lying on its back or side, for example, or when otherwise positioned, as desired.

The support columns 3 are of uniform cross section for the entire length thereof and position the support platforms thereon normal to the longitudinal axes of such support columns. Hence, the support platforms are parallel to each other and to the upper surface of the sub-base, or of the base 2 dependent upon which is used as a reference. The transverse axes of such support platforms are exactly parallel to each other and to the transverse axis of said base 2 and sub-base 37.

It should be noted that the top surface of the gage base 2 normally is provided as a locater surface in the gage 1, whereas also the upper surface of the sub-base 37 can be used for gaging or locater action in the gage 1. As indicated, by removing the sub-base 37 and bringing other sub-bases into the gage 1, any desired vertical or arcuate measurement from the upper surface of the base can be provided. Other types of gage means can be positioned on the sub-base, if desired. Suitable locater pins or gages can be positioned on such sub-base, turret style gage means can be provided thereon, etc. as desired.

It also should be realized that either the inner or outer lateral surface of the support platforms, or cartridges 8 provided in the gage 1 and indicated at 8a and 8b, respectively, are flat and can be used for reference purposes and that the guillotine gage blades positioned on such platforms can use either the outer or the inner surface of the support platforms for locater action, if desired. The gage blades can have suitable flanges or lugs thereon to limit their movement in the holders provided. The lateral surfaces 3a and 8b of the support platforms are parallel to each other and to the transverse axes of the platforms. Any desired gage means can be positioned by the cartridge or support platforms 8. The lateral surfaces 8a and 8b of the support platforms are normal to the flat top surface 2a of the base.

From the foregoing, it will be seen that the gage blades 18, 19, 20 and 21 may be easily changed to measure other articles and that the positions of the support platforms are readily changed. The support platforms can be accurately located in the gage 1 at all times, and the support columns or parts of the gage can be disassembled and reassembled but with the gage parts being accurately located with relation to each other at all times when assembled, even though an interchange of gage bases, sub-bases or support columns is made.

While several complete embodiments of the invention have been disclosed herein, it will be appreciated that modification of these particular embodiments of the invention may be resorted to without departing from the scope of the invention as defined in the appended claims.

What is claimed is:

1. In a gage, a base having a top surface as a reference surface in the gage, a support column having a plurality of sides thereon and being of uniform section for the length thereof, a plurality of vertically spaced means securing said support column to said base to extend perpendicularly upwardly from said reference surface, said base being recessed complementary to said support column to receive and engage corner portions thereof, said support column having a slot extending thereinto from an edge thereof normal to the longitudinal axis of said support column, a key engaging said slot and extending therefrom, said base having a flat top surface, and means securing said key to said base and bearing on said flat top surface to secure said support column against any vertical movement.

2. A gage as in claim 1 wherein said support columns are of quadrangular shape in section and are positioned on said base to present pairs of adjacent surfaces normal to each other for engagement with said base, and where said support platforms have edge surfaces normal to each other for engaging said support columns, and end caps engaging said support columns and being secured to said support platforms to secure them to said support columns in exactly parallel, aligned relation with one axis of each said support platform lying on a diagonal of the said support column to which such support platform is secured.

3. In a gage, a base, a plurality of support columns having a plurality of sides thereon and at least one contoured flat surfaced corner edge thereon, means securing said support columns to said base to extend perpendicularly upwardly therefrom, said base being recessed complementary to said flat surfaced corner edges of said support columns to receive and engage said corner edges, a plurality of support platforms, means securing said support platforms to said support columns at desired vertically spaced and vertically adjustable positions thereon to be supported solely thereby and to extend normally therefrom, said support platforms having recessed edge sections contoured complementary to said flat corner edges of said support columns to such support columns and engage therewith and position the traverse axes of said support platforms all parallel with each other and the transverse axis of said base, the transverse and longitudinal axes of the support platforms on any one of said support columns being positioned in vertical alignment by the interengagement of said support column and support platforms, said recessed edge sections of said support platforms extending normally to planes defined by said support platforms means carried on said base to engage and position a test article, and gage means carried by said support platforms to extend therefrom and engage a test article carried by said last-named means for gaging action.

4. A gage comprising a base having a flat top reference surface thereon, a pair of support columns of generally square shape in section and having adjacent sides normal to each other, means securing one of said support columns to said base near each end thereof, said base being recessed on one side thereof near its ends and being contoured complementary to corner and adjacent side portions of said support columns, a plurality of support platforms having flat edge surfaces at one end contoured to engage corners of said support columns, removable means securing said support platforms to vertically spaced portions of said support columns for sole support action thereby with the contoured surfaces in engagement to be vertically adjustable on and extend from said support columns and with said support platforms being normal to the axes of said support columns, the axes of said support platforms secured to any one support column being aligned in a direction parallel to the longitudinal axis of said support column, gage means carried by said support platforms and positioned parallel to said reference surface to check an article carried in the gage, a sub-base removably carried by said base on the reference surface thereof for movement along one axis thereof and a turret rotatably carried by said sub-base to position an article for gage action.

5. A gage as in claim 4 wherein index means are provided for said turret and comprise a key slidably carried by said sub-base for limited axial movement and engaging a slot in said turret, said key having a reduced width end section in constant engagement with said slot to limit arcuate movement of said turret, and a wider section to engage said slot for index action.

6. A gage comprising a base having flat surfaced V-shaped recesses in one side thereof adjacent opposite end portions thereof and a top surface normal to the flat surfaces of said recesses, longitudinally straight support columns having flat edge portions contoured complementary to said base edge recesses, means engaging vertically spaced portions of said support columns to secure them to said sides of said base with the contoured portions thereof in tight engagement to extend normally to said top surface, a plurality of support platforms with edge surfaces thereon, individually removable means including end caps and pairs of bolt means engaging said support column and said support platforms adjacent spaced portions of said support columns for individually and solely securing said support platforms to said support column at desired vertically spaced positions thereon to extend therefrom normal to the longitudinal axis of said support column, said support platforms each having an edge thereon with a recess therein contoured at an angle complementary to the said corner on said support column and engaged therewith, an axis of each said support platform being vertically aligned with a corresponding axis on the other support platforms on said support column and with such axes coinciding with an extension of a diagonal of said support column, at least some of said edge surfaces of said support platforms extending parallel to the axis of said support column and providing reference surfaces in the gage, and gage means carried by said support platforms.

7. A gage comprising a base having flat surfaced V-shaped recesses in one side thereof adjacent opposite end portions thereof and a top surface normal to the flat surfaces of said recesses, longitudinally straight support columns having flat surfaced edge portions contoured complementary to said base edge recesses, means engaging vertically spaced portions of said support columns to secure them to and against said edge portions of said base recesses with the contoured portions of said support columns in tight engagement with said base recesses to extend normally to said top surface, a plurality of support platforms with edge surfaces thereon, individually removable means engaging said support platforms to individually and solely secure said support platforms to said support column at desired vertically spaced positions thereon to extend therefrom normal to the longitudinal axis of said support column to be supported thereby, said support platforms each having an edge thereon with a recess therein contoured at an angle complementary to the said edge portions of said support column and engaged therewith, an axis of each said support platform being vertically aligned with a corresponding axis on the other support platforms on said support column, at least some of said edge surfaces of said support platforms extending parallel to the axis of said support column and providing reference surfaces in the gage, and gage means carried by said support platforms.

8. A gage comprising a base having flat surfaced V-shaped recesses in one edge thereof with walls normal to each other adjacent opposite end portions thereof and a top surface normal to the flat surfaces of said recesses, longitudinally straight support columns of generally square shape in section having flat corner forming walls contoured complementary to said base edge recesses, means engaging vertically spaced portions of said support columns to secure them to said edge of said base with the contoured portions of said support columns in tight engagement with said base recesses to extend normally to said top surface, a plurality of support platforms with edge surfaces thereon, removable means engaging said support platforms adjacent diagonally opposed portions of said support columns for individually securing said support platforms to said support column at desired vertically spaced positions thereon to extend therefrom normal to the longitudinal axis of said support column for sole support, said support platforms each having an edge thereon with flat walls normal to each other and of a size and shape complementary to a corner on a said support column and engaged therewith, an axis of each said support platform being vertically aligned with a corresponding axis on the other support platforms on said support column and with such axes coinciding with an extension of a diagonal of said support column, at least some of said edge surfaces of said support platforms extending parallel to the axis of said support column and providing reference surfaces in the gage, and gage means carried by said support platforms.

9. In a gage, a base having a flat top surface as a reference surface in the gage, means operatively secured to said base to position a test article thereon, a plurality of support columns having a plurality of flat sides forming corners thereon and being of uniform section for the length thereof, means securing said support columns to said base at spaced portions thereof to extend perpendicularly upwardly from said reference surface, said base being recessed complementary to a said corner of said support columns to receive and engage a said corner thereof, a plurality of support platforms having flat edge surfaces thereon contoured complementary to a said corner of said support columns, means securing said support platforms to said support columns at desired vertically spaced positions thereon to be supported solely thereby and to extend normal to the longitudinal axis thereof parallel to said base reference surface, the longitudinal and transverse axes of said support platforms on any one of said support columns being aligned and vertically superimposed, said last named means engaging at least a pair of spaced portions of each of said support platforms to press said flat edge surfaces on each said support platform against a pair of flat surfaces on said support column, said support platforms having parallel edge surfaces thereon forming reference surfaces in the gage, and gage means carried by said support platforms and engageable with one of said reference surfaces thereon to extend therefrom to gage a test article positioned by said first named means.

10. A gage comprising a base, means operatively secured to said base to secure a test article thereto, a plurality of support columns of generally square shape in section and with adjacent sides being normal to each other, means securing one of said support columns to said base near each of the ends thereof, said base having vertically extending flat surfaced edge recesses contoured complementary to corner portions and adjacent sides of said support columns for receiving said support columns, a plurality of support platforms each having a flat surfaced edge contoured complementary to the inner edge and adjacent sides of said support columns, removable means securing said support platforms to said support columns to be vertically adjustable thereon and to extend therefrom with all transverse axes of said support platforms parallel to each other and in vertical alignment with similar axes of other support platforms on the same support column, said removable means engaging spaced portions of each of said support platforms to force a pair of flat surfaces of said edge thereof tightly against a pair of flat surfaces of said support columns to secure said support platforms to said support columns for sole support thereby, and gage plates slidably and individually carried by said support platforms to extend normally therefrom towards the center of the gage for gaging a test article secured to said first named means.

11. In a gage, a base having a top surface as a reference surface in the gage, means operatively secured to said base to secure a test article thereto, a plurality of support columns having a plurality of flat sides forming corners thereon and being of uniform section for the length thereof, axially spaced means securing each of said support columns to said base to extend perpendicularly upwardly from said reference surface, said base being recessed complementary to said support columns to receive and engage a said corner portion thereof, key means secured to said reference surface of said base and engaging slots in said support columns normal to the longitudinal axes thereof to aid in accurately positioning said support columns in a vertical direction with relation to said reference surface, a plurality of support platforms each defining a plane and having flat edge surfaces thereon extending normal to the plane of such support platform, means securing said support platforms to said support columns at desired vertically spaced positions thereon to be supported solely thereby and to extend normally therefrom parallel to said base reference surface, said last-named means engaging at least a pair of spaced portions of each of said support platforms to press a pair of flat edge surfaces on each said support platform against a pair of flat surfaces on said support column, and gage means carried by said support platforms to extend therefrom to gage a test article positioned by said first-named means.

References Cited in the file of this patent

UNITED STATES PATENTS

| | | |
|---|---|---|
| 895,093 | Knight | Aug. 4, 1908 |
| 1,508,084 | Collis | Sept. 9, 1924 |
| 2,238,782 | Roche | Apr. 15, 1941 |
| 2,325,558 | Uslan | July 27, 1943 |
| 2,519,942 | Tedrick | Aug. 22, 1950 |
| 2,524,538 | Pearson | Oct. 3, 1950 |
| 2,565,787 | Tennant | Aug. 28, 1951 |
| 2,638,678 | Darabaris | May 19, 1953 |
| 2,700,826 | Rifner | Feb. 1, 1955 |
| 2,709,854 | Price | June 7, 1955 |
| 2,715,278 | Harrison | Aug. 16, 1955 |
| 2,775,039 | Price | Dec. 25, 1956 |
| 2,775,038 | Price | Dec. 25, 1956 |
| 2,858,615 | Aller | Nov. 4, 1958 |
| 2,879,602 | Powers | Mar. 31, 1959 |

FOREIGN PATENTS

| | | |
|---|---|---|
| 408,394 | Great Britain | Apr. 12, 1934 |
| 153,028 | Australia | Aug. 31, 1953 |
| 1,048,130 | France | Dec. 31, 1953 |

OTHER REFERENCES

Tooling Production, page 168, Aug. 1955.